United States Patent

[11] 3,543,746

| [72] | Inventor | John E. Hotchkiss |
| | | Corte Madera, California |
| [21] | Appl. No. | 675,811 |
| [22] | Filed | Oct. 17, 1967 |
| [45] | Patented | Dec. 1, 1970 |
| [73] | Assignee | Hotchkiss Instruments Inc. |
| | | a corporation of California |

[54] ENDOSCOPE HAVING IMPROVED ILLUMINATION SYSTEM
3 Claims, 6 Drawing Figs.

[52] U.S. Cl. .................................................. 128/9,
128/22; 240/6.41, 240/10.6; 351/16
[51] Int. Cl. .................................................. A61b 1/06,
A61b 1/22
[50] Field of Search .................................. 128/3—16,
18, 23; 240/2.18, 6.41, 10.6, 10.62, 59(WP);
351/6, 16; 350/277; 95/11H.C.

[56] References Cited
UNITED STATES PATENTS

| 376,601 | 1/1888 | Leiter | 128/9 |
| 672,317 | 4/1901 | Dow | 128/9 |
| 799,114 | 9/1905 | Tracey | 240/2.18 |
| 1,608,726 | 11/1926 | DeZeng | 128/9 |
| 1,686,041 | 10/1928 | Smith | 128/9 |
| 2,343,041 | 2/1944 | Arnesen | 128/9 |
| 2,699,770 | 1/1955 | Fourestier et al. | 128/6 |
| 2,823,666 | 2/1958 | Hallpike et al. | 128/9 |
| 3,111,277 | 11/1963 | Grimsley | 240/2.18X |

FOREIGN PATENTS

| 7,126 | 1903 | Great Britain | 128/4 |
| 12,885 | 1912 | Great Britain | 351/6 |
| 381 | 1914 | Great Britain | 128/9 |

*Primary Examiner*—Richard A. Gaudet
*Assistant Examiner*—Kyle L. Howell
*Attorney*—Warren, Rubin, Brucker & Chickering

ABSTRACT: An otoscope is provided with an illumination system which projects a beam of light onto the area to be viewed coaxially with the line of sight through the instrument. For this purpose, a light source is located within the instrument at a position at which it will direct light toward a mirror which is positioned to reflect the light along the line of sight through the instrument and onto the area to be viewed. An aperture is provided centrally through the mirror to permit an unobstructed view through the instrument, and a light shield arrangement is provided for preventing light from the light source from passing through this aperture to cause glare to the eye of the user. The instrument also includes a pressure sensitive switch which facilitates energization of the light source.

Patented Dec. 1, 1970
3,543,746
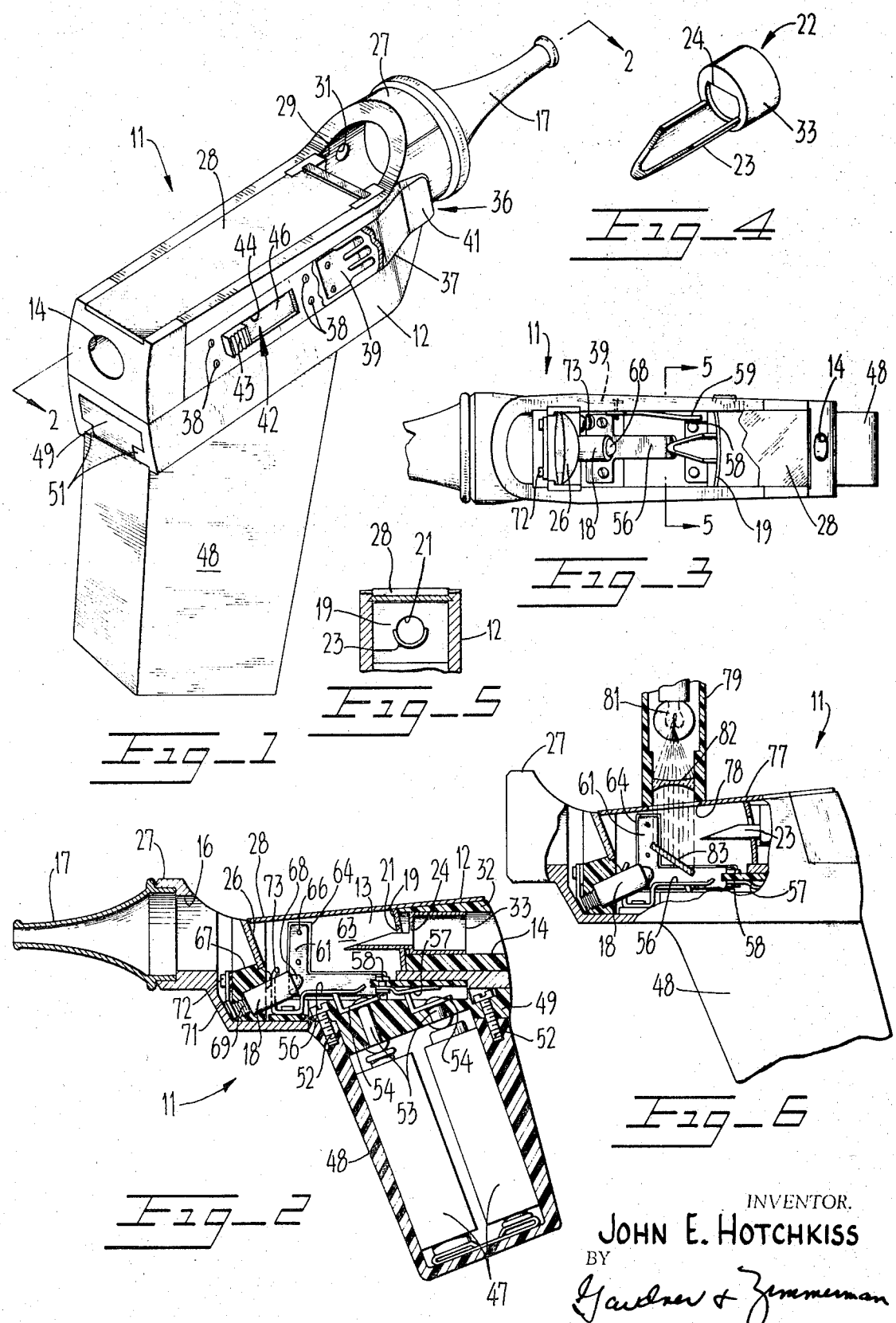
INVENTOR.
JOHN E. HOTCHKISS
BY
Gardner & Zimmerman
ATTORNEYS

3,543,746

ENDOSCOPE HAVING IMPROVED ILLUMINATION SYSTEM

BACKGROUND OF THE INVENTION

This invention relates to endoscopes and similar optical instruments and, more particularly, to such an optical instrument which projects an illuminating beam of light generally coaxial with the line of sight through the instrument and yet which does not cause undesirable glare to the eye of the user.

Most common endoscopes, such as of the type used in the examination of parts of the anatomy, have an inherent parallax error which causes the area to be viewed to be illuminated only partially, or not at all. This is because the rays of light directed from an illuminating source in this type of instrument are not generally coincident with the line of sight or optical axis of the instrument. In an attempt to overcome this parallax, endoscopes have been designed which utilize a mirror surrounding the optical axis to reflect light coming from a source located out of the line of sight coaxially along the line of sight and onto the area to be viewed. However, these endoscopes have generally not been accepted since the mirror must be located in the line of sight through the instrument and an aperture of some sort must be provided through the mirror to permit viewing through the instrument. Light from the light source inevitably passes through this aperture in the mirror and causes an undesirable glare on the eye of the viewer. While several optical instruments have been designed to overcome this problem, they do so in a manner which greatly restricts the amount of light reflected by the mirror to the area to be viewed.

SUMMARY OF THE INVENTION

This invention relates to an endoscope or similar optical instrument by which light directed to the area to be viewed is coaxial with the optical axis or line of sight through the instrument, and yet no objectionable glare is caused on the eye of the viewer while a maximum amount of light from the light source is projected onto the area to be viewed. In its basic aspects, the optical instrument comprises a housing or body which defines a viewing passage and which has openings at opposite ends of the viewing passage to permit viewing therethrough. For the sake of convenience, the opening at the end into which the user looks will be hereinafter referred to as the "viewing" aperture and the opening at the other end of the viewing passage will be referred to as a "sight" aperture. A light source is located within the housing at a position which is out of the line of sight through the viewing passage. Such light source is disposed to direct light rays angularly in the direction of the viewing aperture, and a mirror is disposed within the viewing passage in a location for intercepting light from the source and reflecting it coaxially along the optical axis of the body and out through the sight aperture to illuminate the area to be viewed. The mirror has an aperture along the optical axis or line of sight to permit an unobstructed view through the housing, and a light shield is disposed between the light and mirror to block the passage of light from the light source through the mirror aperture and into the eye of the viewer. Desirably, the light shield includes a longitudinal tubular section or segment which defines a portion of the viewing passage by extending outward from the edges of the mirror aperture in the direction of the sight aperture. The tubular segment has an edge configuration which blocks the direct passage of the light rays through the mirror aperture while yet allowing direct passage of the light rays to the mirror for reflection through the sight aperture. In this manner, undesirable glare on the user's eye is avoided, while a maximum amount of light from the light source is transmitted to the mirror for reflection along the line of sight onto the area to be viewed. The instrument of the invention also includes a pressure sensitive switch arrangement by which the light source can be energized in a simple and straight forward manner. Its structure is such that the above features are provided in a compact, lightweight and easy to use arrangement.

BRIEF DESCRIPTION OF THE DRAWING

With reference to the accompanying drawing:

FIG. 1 is a rear perspective view of a preferred embodiment of an endoscope of the invention with portions thereof broken away to illustrate details thereof;

FIG. 2 is a cross-sectional view of the endoscope of FIG. 1 taken on a plane indicated by the lines 2–2 in FIG. 1;

FIG. 3 is a partial top plan view of the endoscope of FIG. 1 with portions thereof broken away to illustrate its construction;

FIG. 4 is an enlarged perspective view of a preferred light shield arrangement for the endoscope of FIG. 1;

FIG. 5 is a partial cross-sectional view taken on a plane indicated by the line 5–5 in FIG. 3 illustrating the mirror and light shield arrangement of the invention; and FIG. 6 is a partial side elevational view with portions thereof broken away depicting a manner in which an auxiliary lighting means is utilizable with the endoscope of FIG. 1.

DESCRIPTION OF THE PREFERRED EMBODIMENTS

With reference to the drawing, the present invention is illustrated in the form of an otoscope although it will be appreciated that it is equally applicable to other endoscopes and optical instruments. The otoscope, generally referred to by the reference numeral 11, includes a body portion or housing 12 which is generally hollow to provide a viewing passage 13 extending longitudinally therethrough. A viewing aperture 14 and a sight aperture 16 are provided at opposite ends of the housing to permit a viewer to look through the instrument at the object or area to be studied. As is mentioned in the summary, the viewing aperture 14 is the aperture into which the user looks, and the sight aperture 16 is the aperture out of which the user looks.

As is conventional, a hollow conical tip or speculum 17 is secured to housing 12 about sight aperture 16 and coaxial with viewing passage 13. The interior surface configuration of speculum 17 is different from that of conventional speculums employed with otoscopes as will be explained hereinafter.

To permit illumination of the object or area to be viewed, the otoscope includes an illumination system. More particularly, a light source 18 is mounted within the housing at a position which is offset from the viewing passage or, in other words, out of the line of sight through the instrument. Light source 18 is so disposed within the housing that it will transmit light rays angularly in the direction of the viewing aperture. A concave mirror 19 is positioned between light source 18 and viewing aperture 14 for reflecting light rays from source 18 along the optical axis or line of sight of the body and out through the speculum 17. In this connection, it will be noted that mirror 19 is slightly concave and is at a slight angle to the optical axis to cause the reflected light rays to travel parallel to the optical axis. Mirror 19 is also provided with a central aperture 21 coaxial with the optical axis or line of sight through the instrument to thereby enable an unobstructed view therethrough by the user.

Illumination systems generally similar to that described above have been available in the past. They have the advantage of substantially eliminating parallax error by causing the light rays to be generally coincident with line of sight through the instrument. However, they have not been acceptable since light from the light source passes through the aperture in the mirror and causes an appreciable glare to the eye of the viewer. In accordance with the instant invention, a light shield, generally referred to by the reference numeral 22, blocks direct passage of light from the light source through the aperture within the mirror. More particularly, the light shield 22 includes a tubular segment or section 23 which extends through the aperture 21 in the direction of the sight aperture and defines a portion of the viewing passage. As shown, segment 23 is generally semicylindrical in shape and seals the lower edge of the mirror aperture to prevent passage of light therethrough. The forward end of segment 23 is cut on a bias to provide segment 23 with an outer portion which tapers inwardly toward the outer ends of the segment. As can be seen from FIGS. 2 and 3, this inwardly taper provided by the bias cut causes the segment to come to a point in both a horizontal and a vertical plane in view of the cylindrical configuration of the segment. It has been found that with this arrangement, a maximum amount of the light emitted by source 18 may reach mirror 19 for reflection along the optical axis of the body, while direct passage of the light through the aperture in the mirror is prevented. In this connection, the wedge bias is desirably cut so that it is in a plane containing the central axis of the light rays emitting from source 18. Light shield 22 also includes a depending stop portion 24 which is positioned between the mirror and the viewing aperture in a location at which it will prevent any light rays which might strike the upper edge of the mirror aperture 21 and be refracted thereby from passing to the viewing aperture and causing glare. A lens 26 is located within the viewing passage between mirror 21 and sight aperture 16. This lens is for the purpose of simultaneously magnifying the image to be viewed and focusing the light reflected from mirror 21 onto the image. It will be noted that this lens is oblique with respect to the optical axis or line of sight through the body. Because of this, any light reflected therefrom will be reflected angularly away from the optical axis rather than parallel thereto and back into the eye of the user.

The more detailed construction of the specific embodiment shown will now be described. Housing 12 is generally rectangular in shape and has a tubular forward end 27 which defines sight aperture 16. Upper wall 28 of housing 12 tapers inwardly of the housing in the forward direction and terminates at a position spaced from tubular end 27. In this manner an aperture 29 is provided for the insertion of tools or the like through speculum 17 and into the area being viewed. In this connection, it will be noted from FIG. 2 that the interior surface configuration of speculum 17 is flared outwardly from the tip of the speculum to sight aperture 16 in a continuous manner to provide extended room for the manipulation of a tool. The side wall of tubular end 27 also includes an orifice 31 (FIG. 1) to which a pneumatic source such as a hand compressible bulb may be attached as is conventionally done to permit pneumatic pressure to be applied to an object being viewed. In this connection, it should be noted that the side edges of aperture 29 are concavely rounded to facilitate the user sealing such aperture with his thumb.

The rear end of housing 12 is defined by a rectangular block 32 of electrical insulating material. Block 32 has a central bore therethrough defining viewing aperture 14. Mirror 21 is abutted against the forward end of block 32 which has a configuration adapted to hold mirror 19 in proper position for reflecting light from bulb 18 coaxially through speculum 17. Light shield 22 includes a tubular portion 33 adapted to fit tightly within the bore in block 32. Segment 23 projects from tubular portion 33 outward through mirror aperture 21 to prevent light from source 18 from projecting through aperture 19 as discussed earlier. Stop 24 projects downward from tubular portion 33 immediately above the location where segment 23 and tubular portion 33 are joined. This stop extends downward to a position at least parallel with the upper edge of mirror aperture 21 to prevent light refracted from said edge from projecting parallelly backward into the eye of the viewer.

As is best depicted in FIG. 5, mirror aperture 21 is not completely circular. Rather, the bottom half of the aperture has an arcuate recess into which tubular segment 23 of the light shield fits. With this arrangement, it will be seen that the resulting aperture formed when tubular segment 23 projects through the aperture 21 is circular, with an arcuate strip of mirror being provided joining the upper edges of the tubular segment. Thus, as much mirror surface as is practical is provided for directing light from source 18 out through sight aperture 16.

To facilitate energization of light source 18 by the user, a pressure sensitive switch, generally referred to by the reference numeral 36, is on one side wall of housing 12.

Switch 36 includes an actuating leaf spring switch and contact member 37 which extends longitudinally of housing 12 and has one of its ends secured to housing 12 such as by means of screws 38. A three prong spring contact 39 is secured to housing 12 beneath leaf spring member 37. Leaf spring 37 is normally spaced from contact 39, and the switch is therefore normally open. However, upon the free end 41 of spring member 37 being depressed toward the housing by the user, contact is made between spring member 37 and prong contact 39. As will be more fully understood, hereinafter, this closing of the switch 36 will complete the circuit by which a power source energizes light source 18.

In some instances, it is desirable that the switch remain in a closed or "on" position without the necessity of pressure being applied to leaf spring 37. For this purpose, a slidable switch actuator 42 is provided. Actuator 42 includes a serrated push button 43 which projects through an elongated slot 44 is spring member 37. A contact tongue 46 of the actuator is positioned between leaf spring member 37 and the housing. Such tongue contact is secured to button 43 and adapted to be slidably moved by the button between a position in which it is disposed directly between spring contacts 37 and prong contact 39 and acts as an intermediate contact member therebetween and a position withdrawn from between such contact members. Thus, movement of button 43 forwardly of the instrument will cause the closing of switch 36, and the switch can only be opened again by the operator sliding button 43 rearwardly.

In this embodiment, the power supply for light source 18 is provided by a pair of serially arranged batteries 47 disposed within a casing 48. As shown, casing 48 depends from adjacent the rear end of housing 12 to provide a pistol grip arrangement by which the user may grasp the otoscope. Casing 48 is secured to housing 12 by means of a dovetail arrangement. More particularly, the upper end of casing 48 is provided with a tenon 49 adapted to be slidably received within a mortise defined at the bottom end of housing 12 by inwardly extending flanges 51. It will be appreciated that with this arrangement, casing 48 can be disconnected from housing 12 by sliding it rearwardly thereof to disengage tenon 49 from the housing mortise. Thus the casing is easily removed from the housing to permit changing of the batteries therein or substitution of another power supply source such as of the type which is commonly worn on a cord about the neck of the user.

Casing tenon 49 also acts as a cover for the casing and is normally suitably secured thereto such as by means of bolts 52. Contact pins 53 extend through tenon 49 to electrically connect the batteries 47, in a conventional fashion with corresponding contacts on the housing. In this connection, it will be noted that each of the pins 53 terminates exterior of the casing in an L-shaped contact point member 54. Upon casing tenon 49 being properly engaged within the mortise defined by flanges 51 at the bottom of housing 12, L-shaped contact members 54 engage spring contacts 56 and 57 in the mortise. Spring contact 57 is electrically connected as by means of pins 58 to a transversely extending bar 59. Bar 59, in turn, is engaged by an L-shaped electrical lead plate 61 which is mounted to the interior surface of the side wall 63 of housing 12. To isolate electrically lead plate 61 from side wall 53, an L-shaped sheet of insulating material 64 is disposed therebetween and the pins 66 providing the securance of the plate to the housing are coated with an insulating material. On the exterior surface of side wall 63, pins 66 act to secure the prong contact 39 of switch 36 to the housing, as well as electrically connect it to plate 61. The other side of switch 36, i.e., leaf spring 37, is electrically connected to housing side wall 63 by means of the screws 38. Sidewall 63 is in turn in electrical contact with light source mounting block 67. Block 67 provides a socket for the reception of a light bulb 68 providing source 18, and acts as an electrical connection to one side of the filament thereof by way of the threaded base 69 of such light bulb in a conventional manner. To complete the circuit, a contact plate 71 is mounted in insulated relation to block 67 in position to electrically engage the other light bulb contact which conventionally extends coaxially outward from light bulb base 69. Contact plate 71 is connected to block 67 by means of a pin 72 which is coated with an insulating material to electrically insulate the same from block 67. Plate 71 acts as an electrical contact engaging an upstanding flange 73 on spring contact 56.

It will be appreciated that with the above arrangement, depression of the free end 41 of leaf spring 37 will complete a series connection between the batteries 47 and light source 18, with the result that light source 18 will be energized. The circuit will also be completed with a consequent energization of light source 18 upon forward sliding of slide switch 42.

The case by which the optical instrument of the invention can be used in illuminating and examining an object or area will be readily appreciated. The user need only hold the instrument to his eye, point or direct it to the area to be viewed and depress the pressure sensitive switch to illuminate the same. This can be accomplished with one hand, thereby freeing the other hand for performing tasks such as the manipulation of tools through the speculum 17.

In some instances, it is desirable that a photograph of an area be taken through an endoscope. Light source 18 would normally not provide sufficient illumination for the taking of the photograph, and it is desirable that a flash bulb arrangement be used for this purpose. FIG. 6 depicts a flash attachment particularly adapted for mounting to the otoscope. In this connection, it will be noted that the upper wall 28 of housing 12 is secured between the sidewalls of the housing by a tongue and groove arrangement as depicted in FIG. 5 such that it can be slidably removed from the housing. A substitute upper wall, referred to by the reference numeral 77 in FIG. 6, can then be placed in its position. As shown, substitute wall 77 has an aperture 78 therethrough over which is mounted a cylindrical flash bulb socket casing 79. A flash bulb 81 and focusing lens 82 are suitably mounted therein, and a conventional power source for the bulb is provided (not shown). A beam splitting mirror 83 is suitably mounted within housing 12 to reflect a portion of the light from light bulb 81 to mirror 19 for consequent reflection through the instrument to the object to be viewed. Mirror 83 is of the beam splitting type so that light from source 18 can pass therethrough and also be reflected from mirror 19 for focusing purposes. That is, when it is desired to take a photograph of an object through the instrument, source 18 is first energized to permit proper positioning of the instrument relative to the object to be photographed. Then bulb 81 is energized simultaneously with the opening of the shutter of the camera to provide the necessary illumination for the photo taking.

It will be appreciated that other arrangements can be utilized for enabling the taking of photographs through the instrument. For example, lens 26 could be replaced by a beam splitting mirror adapted to reflect light from a flash bulb onto the mirror 19 and back through the beam splitting mirror to the image to be viewed.

I claim:

1. An endoscope having a housing defining a viewing aperture and a sight aperture separated by a sight passage with reflector means disposed in the sight passage and defining an aperture which defines a portion of the sight passage and a light source disposed outside of the sight passage directing light onto said reflector means, comprising in combination a tubular segment extending from the reflector means aperture in the direction of the sight aperture and defining a portion of the viewing passage, said segment having an edge configuration blocking direct passage of light from the light source through the reflector means aperture while allowing direct passage of light to the reflector means for reflection along the viewing passage and through the sight aperture.

2. The endoscope of claim 1, wherein said tubular segment is generally semicylindrical and the free end thereof is tapered inwardly and toward the light source.

3. The endoscope of claim 1, wherein said tubular segment includes a stop positioned between the reflector means and the viewing aperture for blocking the passage of light rays refracted from the edges of the aperture in the reflector means.